United States Patent [19]
Fry

[11] Patent Number: 6,061,873
[45] Date of Patent: May 16, 2000

[54] PATIENT SUPPORT APPARATUS AND HINGE DEVICES

[75] Inventor: Timothy S Fry, Coventry, United Kingdom

[73] Assignee: Mangar International Limited, Presteigne, United Kingdom

[21] Appl. No.: 09/216,911

[22] Filed: Dec. 21, 1998

Related U.S. Application Data

[63] Continuation of application No. PCT/GB97/01613, Jun. 16, 1997.

[30]      Foreign Application Priority Data

Jun. 21, 1996 [GB] United Kingdom ................... 9613079

[51] Int. Cl.$^7$ ................................. E05F 3/00; E05D 1/00
[52] U.S. Cl. ................................ 16/271; 16/225; 16/257; 16/221; 403/291; 5/613; 5/617
[58] Field of Search .............................. 16/271, 268, 225, 16/227, 257, 260, 261, DIG. 13, 221; 5/613, 617; 403/291, 119

[56]             References Cited

U.S. PATENT DOCUMENTS

| | | | |
|---|---|---|---|
| 2,526,129 | 10/1950 | Groesbeck et al. | ....................... 16/225 |
| 3,988,906 | 11/1976 | Smith | ....................... 403/291 |
| 4,354,611 | 10/1982 | Propst et al. | ............................... 16/225 |
| 4,563,381 | 1/1986 | Woodland | ................................. 16/225 |
| 4,670,938 | 6/1987 | Fowlston . | |
| 4,688,760 | 8/1987 | Garman et al. . | |
| 4,799,727 | 1/1989 | Robbins et al. | ........................... 16/225 |
| 5,070,577 | 12/1991 | Bonneville et al. | ...................... 16/260 |
| 5,148,850 | 9/1992 | Urbanick . | |
| 5,377,373 | 1/1995 | Shirai | ......................... 5/613 |
| 5,448,789 | 9/1995 | Shirai | ......................... 5/613 |

FOREIGN PATENT DOCUMENTS

| | | |
|---|---|---|
| 2161213 | 7/1973 | France . |
| 2 237 188 | 5/1991 | United Kingdom . |

*Primary Examiner*—Chuck Y. Mah
*Attorney, Agent, or Firm*—Pillsbury Madison & Sutro LLP

[57]              ABSTRACT

Apparatus comprising a platform having a flank panel connected pivotally to a lateral margin of the seat or platform by means of a hinge device, wherein the hinge device comprises at least two mountings and a moulding comprising an elongate flexible web bridging mounting formation which are releasable securable on the mountings; wherein one of the mountings is provided on or secured to the lateral margin of the platform and the other of the mounting is provided on or secured to a margin of the flank panel; so that the web of the moulding provides a flexible bridge between the platform and flank panel.

10 Claims, 5 Drawing Sheets

PATIENT SUPPORT APPARATUS AND HINGE DEVICES

This is a Continuation of International Appln. No. PCT/GB97/01613 filed Jun. 16, 1997 which designated the U.S.

This invention concerns hinge devices for apparatus of a kind having a panel on which a person can be supported, for use in assisting persons to transfer from one support such as a chair, bed or trolley to another such support, the panel being pivotally connected or connectable to one of the supports and movable to overlie part of the other support to serve as a bridge therebetween; and hinge devices for connecting such a panel to a support.

It is known from GB 2237188 to provide an elevating seat or like platform on which a person can sit or recline, for use for example in baths to assist disabled or handicapped persons to get into and out of baths, and to provide such a seat with a hinged flank panel to bridge a gap between the seat and a support, for use in transferring such a person to and from the seat onto or off a support such as a bed or chair.

U.S. Pat. No. 5,148,850 discloses a weatherproof continuous hinge device for articulated vehicular overhead doors, which comprises two elongate relatively rigid parts and a flexible moulding which comprises an elongate flexible web between mounting formations of the moulding; wherein the rigid parts interengage and provide mountings which mounting formations of the moulding resiliently engage so that the web provides a flexible bridge between the two rigid parts.

However, a problem is found to arise when the support is used in baths of a kind in which the bottom slopes relative to the brim along the sides of the bath, because the support, when resting in use on the bottom, becomes inclined and thus the flank panel, when extended across the brim, becomes likewise inclined and does not rest squarely upon the brim.

The hinge device which connects the flank panel and the lateral margin of the seat is thus put under considerable strain when a person rests on the flank panel during transfer into or out of the bath.

According to the present invention there is provided a hinge device for apparatus comprising a platform having a flank panel connected pivotally to a lateral margin of the platform by means of the hinge device, wherein the hinge device comprises a hinge device comprising two elongate relatively rigid parts and a flexible moulding which comprises an elongate flexible web between mounting formations of the moulding; wherein the rigid parts interengage and provide mountings which mounting formations of the moulding resiliently engage so that the web provides a flexible bridge between the two rigid parts, ;and characterised in that:

(a) the or each mounting formation is elastomeric and provides an aperture in which a respective one of the mountings is engaged so that the formation embraces a neck between a head of the mounting and the rigid part to which it is attacked by said neck, and in that:

(b) said mountings interengage so as to provide a knee joint comprising on the one mounting a support in the form of a trunnion or lug, which provides an upwardly facing bearing surface below a female part, in the form of an upwardly extending recess in the mounting between upstanding abutment surfaces in the one mounting; and further comprising on the other mounting a bearing part in the form of a trunnion formation projecting from the head to engage on said bearing surface.

The head is preferably joined to said margin by the neck so as to define a recess, between the head and the margin, to receive the respective mounting formation or part thereof.

The web preferably covers said heads and provides a smooth upper surface between said margins.

A plurality of said mountings are preferably provided on each of said margins.

The knee joint preferably includes a tenon or lug projecting beyond one of said mountings to engage in a downwardly open mortise or recess adjacent the other of said mountings, for supporting the flank panel when it is in a plane close to the plane of the seat or platform.

The knee joint preferably also includes a trunnion formation associated with the mortise or recess to engage on the tenon or lug between upstanding abutment surfaces at the sides of the tenon or lug.

Each mounting formation may be reinforced by a longitudinally extending stiffener, such as a rod moulded into an upper portion of said moulding. The web may be internally reinforced by incorporation in the moulding of a flexible but substantially inelastic layer, e.g. a strip or band of fibrous material.

One or both end portions of the hinge device may be formed to provide a bias tending to urge the device to a predetermined configuration, and thus, in use, to urge the flank panel towards a corresponding orientation with respect to the seat or platform. Said end portions may comprise transverse elastic webs of the moulding extending across the hinge device to interconnect dependent end parts of the mounting formations.

Instead of the hinge device being securable to a support and panel, the elongate rigid parts are preferably integral with the panel and the support so that the mountings are formed on lateral margins of the panel and support.

In an embodiment, the flank panel is supported on the seat or platform by one or more knee joints. Each knee joint preferably includes a tenon or lug projecting from said lateral margin of the seat to engage in a downwardly open mortise or recess in the margin of the flank panel for supporting the flank panel when it is in or slightly below a plane close to the plane of the seat or platform.

The knee joint preferably also includes a trunnion formation on the flank panel to engage on the tenon or lug between upstanding abutment surfaces on the seat or platform.

The invention will be described further, by way of example, with reference to the accompanying diagrammatic drawings, wherein.

Figure 1:
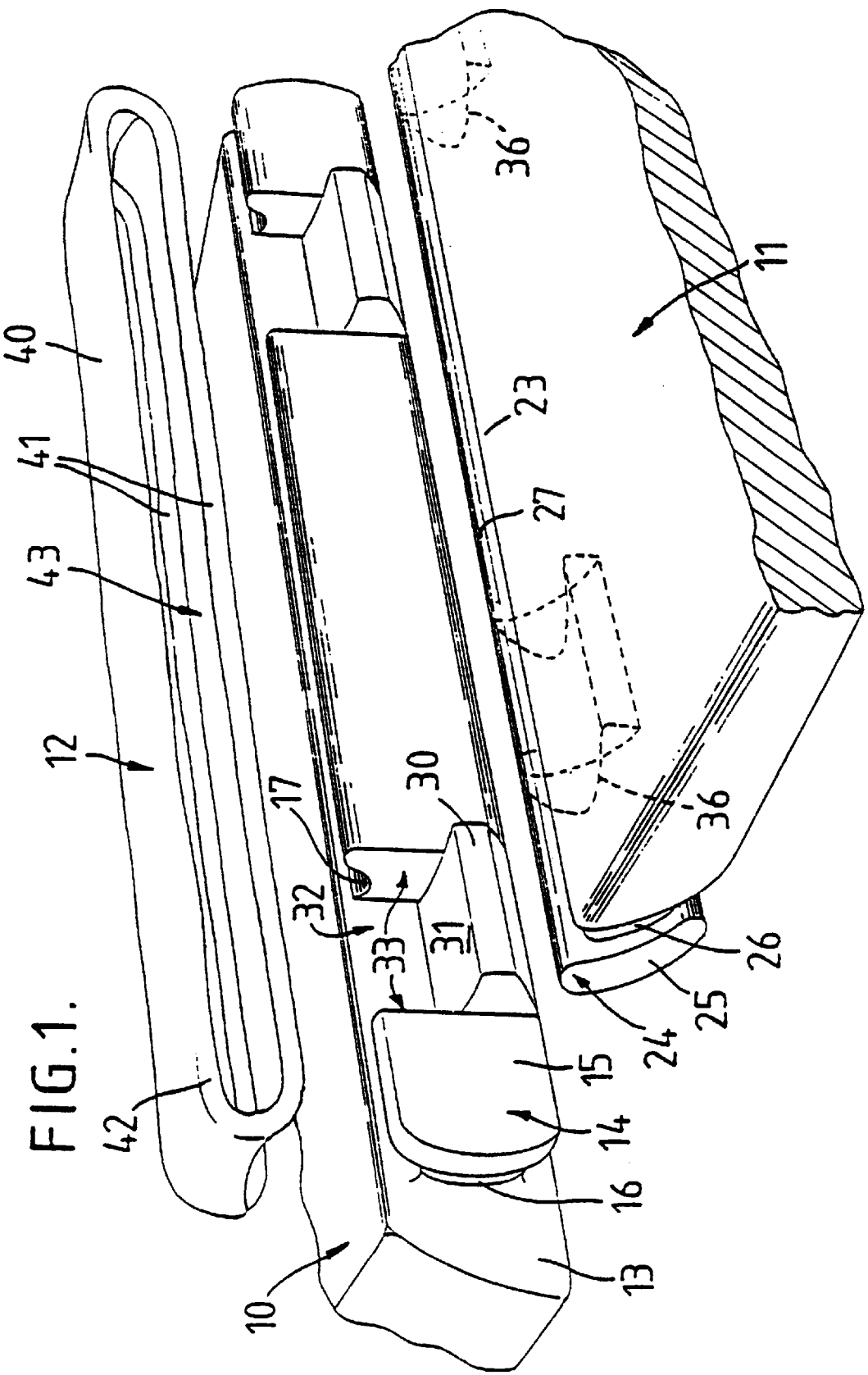
FIG. 1 is an exploded perspective view showing a hinge device and portions of a seat and a flank panel of a first embodiment of apparatus of the invention.

The apparatus primarily includes a seat 10, a flank panel 11 and a hinge device 12. The seat 10 is supported on a lifting device of known form which is not shown in the drawings; and is moulded from a substantially rigid plastic material so that at least one lateral margin 13 of the seat provides at least one mounting 14 and knee-joint parts hereinafter described.

The flank panel 11 is moulded from a plastic material so as to decrease in thickness and stiffness from a maximum along a margin 23 to a minimum along a free end 21 (FIG. 2), and so that said margin 23 provides at least one mounting 24 and further parts of the knee-joints as hereinafter described.

Each mounting 14,24 comprises a head 15,25 joined to the margin 13,23 by a neck 16,26 so that a recess 17,27 is defined around each mounting between the respective head and margin.

In the first embodiment (FIGS. 1 to 3) there is one elongate mounting 14 or 24 on each margin 13 or 23 which is interrupted by two knee-joints, whereas in the second and third embodiments there are two mountings 14 or 24 on each margin 13 or 22 each of which is interrupted by a respective one of two knee-joints.

Figure 3:
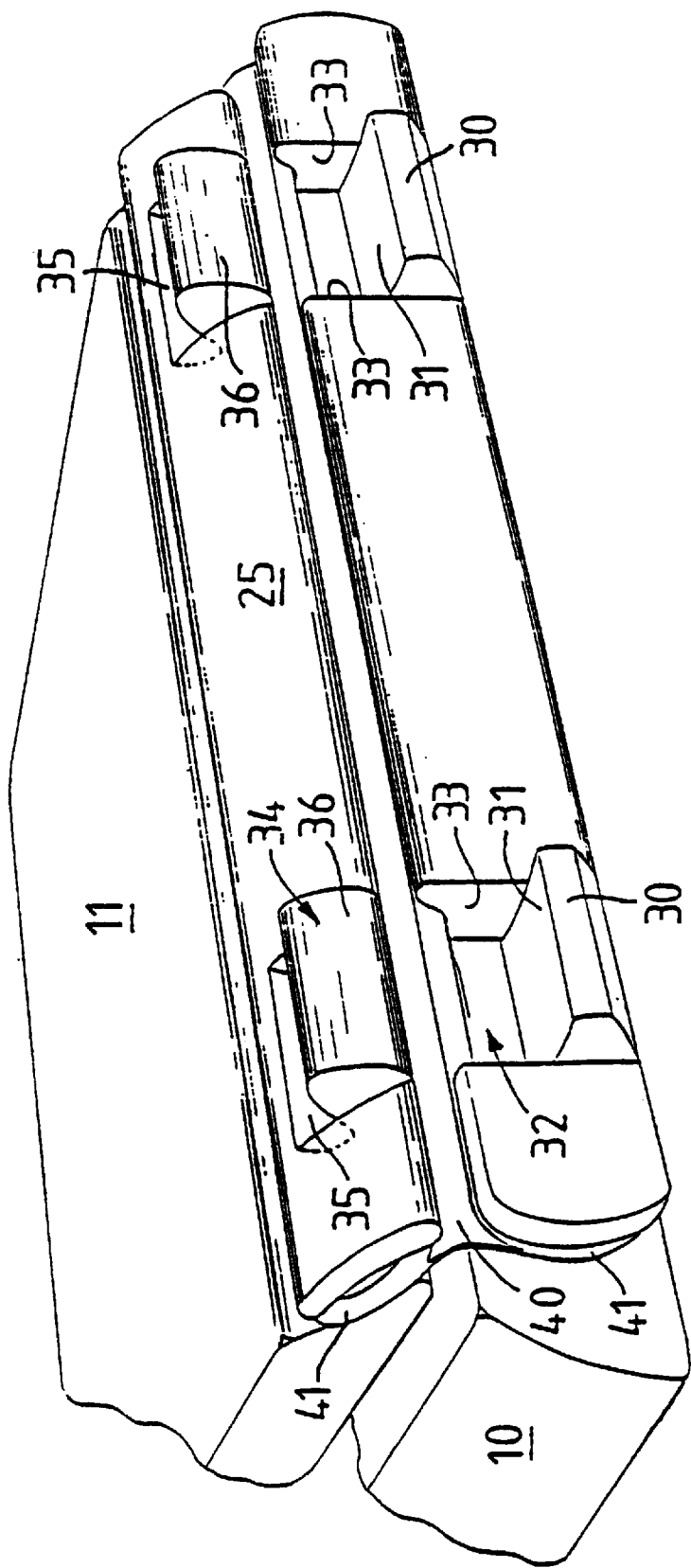
Figure 4:
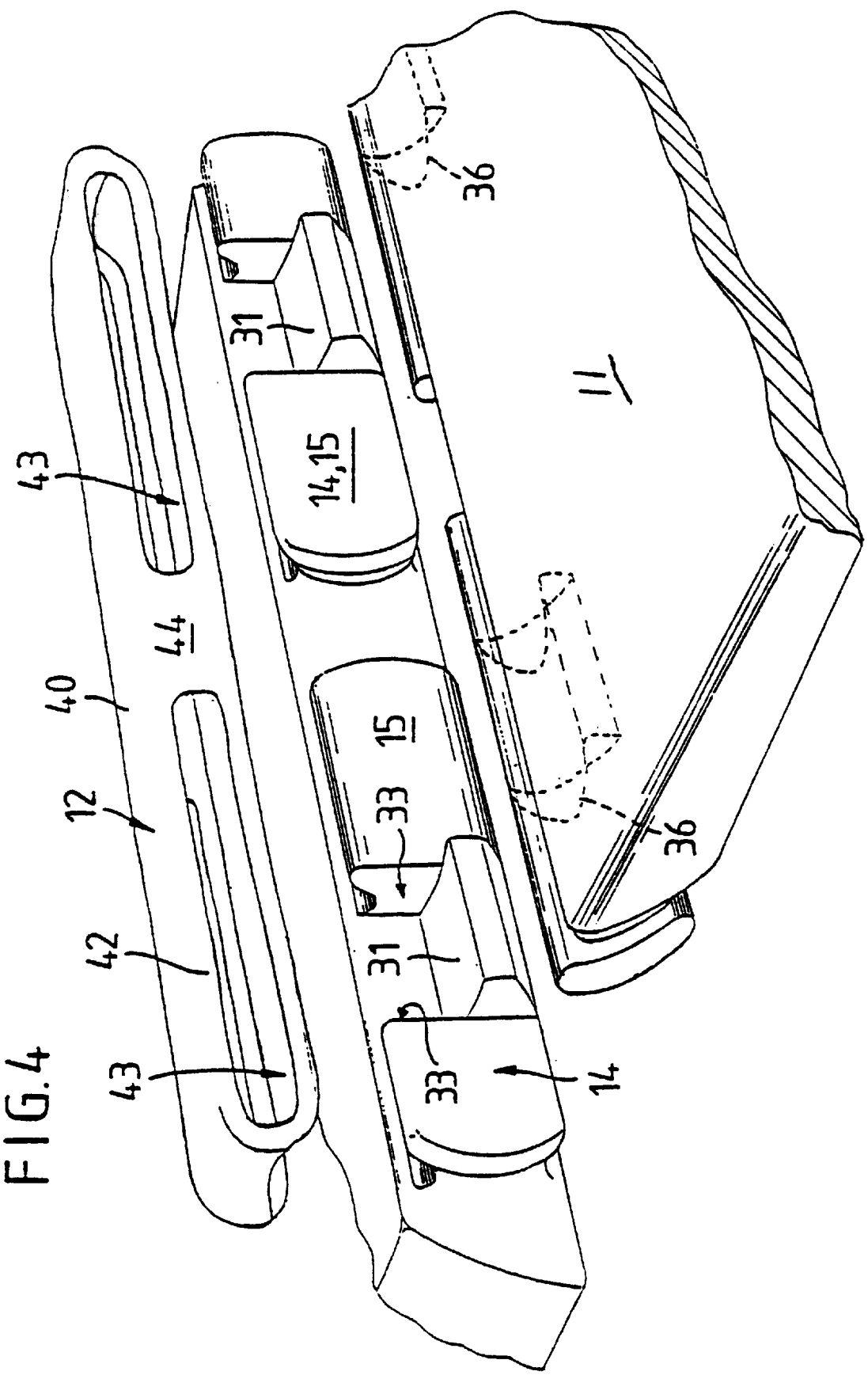
FIG. 4 is a view similar to FIG. 1 of a second embodiment of the invention.
Figure 5:
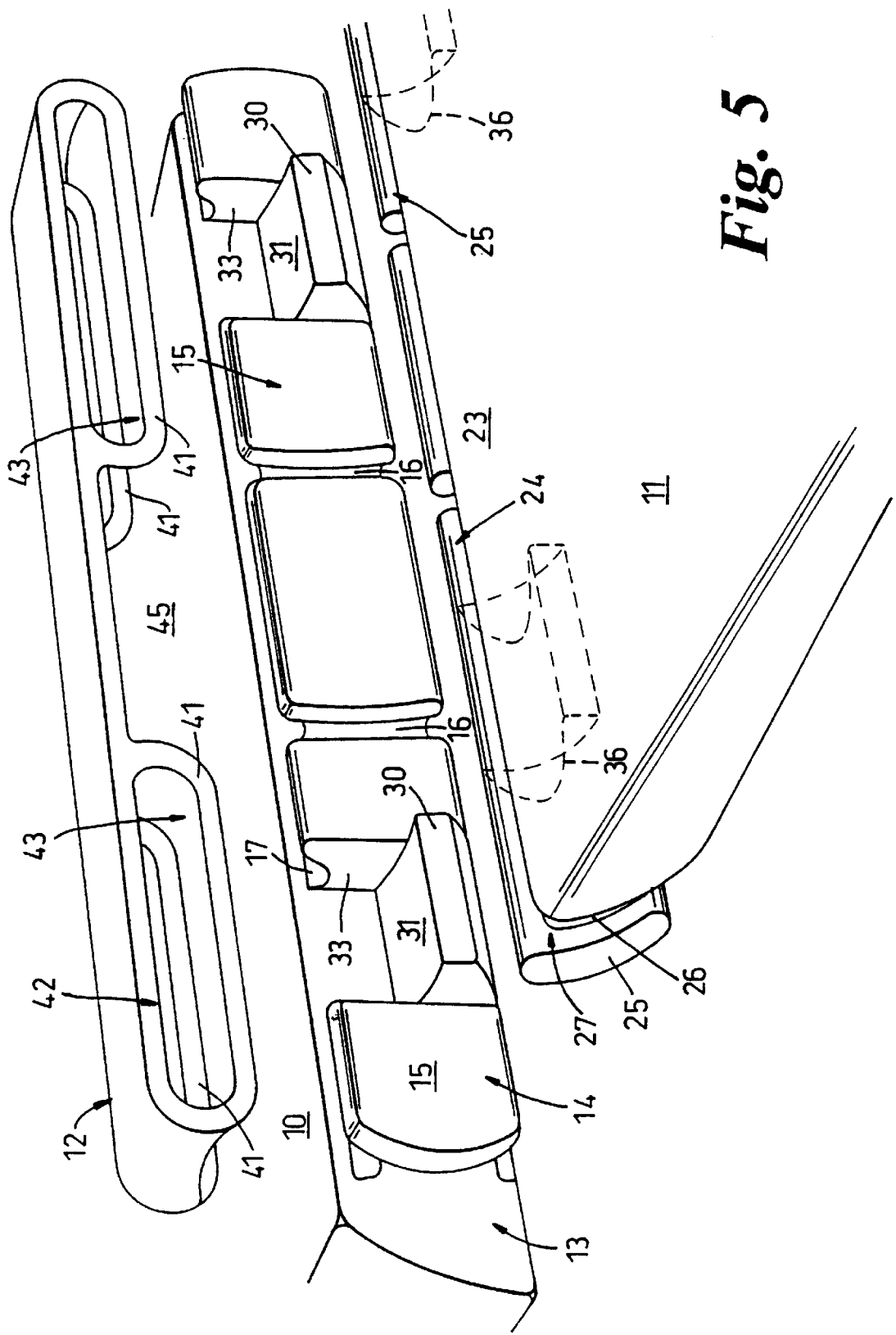
FIG. 5 is a view similar to FIG. 1 of a third embodiment of the invention.

Each knee-joint includes a support 30, in the form of a tenon or lug, projecting from the margin 13 and outwardly beyond the head 15 to present an upwardly facing bearing surface 31 below a female part 32 in the form of a recess in the mounting 14 between upstanding abutment surfaces 33 provided by the mounting 14; and further includes, as shown in FIG. 3, a bearing part 34 in the form of a trunnion formation projecting from the head 25, which bearing part 34 is disposed alongside a concave part 35 in the form of an open mortise or recess formed in the mounting 24 so that the parts 34 and 35 present a substantially S-shaped curved bearing surface 36 to engage on the bearing surface 31 when the flank panel is in use.

The hinge device 12 is a unitary body moulded primarily from an elastomeric material so as to include an elongate flexible web 40 between mounting formations 41.

The web 40 may be internally reinforced with at least one layer of an inelastic flexible material (not shown) to limit or prevent stretching of the web.

Each mounting formation 41 depends from a respective longitudinal junction 42 with the web 40, is relatively thick walled and is apertured to provide an aperture 43 in the first embodiment or two apertures 43 in the second and third embodiments. The formation 41 includes a web 44 between the apertures 43 in the second embodiment, and is interrupted by a space 45 in the third embodiment. Each mounting formation 41 may be longitudinally stiffened by a moulded-in metal or hard plastic rod (not shown) located just below said junction 42 in the first embodiment.

The mounting formations are dimensioned so that they fit in the recesses 17 and 27 after the heads 15,25 have been inserted through the apertures 43 to leave the necks 16,26 embraced by the mounting formations. The web 40 is dimensioned to provide a smooth bridging surface contiguous and co-planar with the upper surfaces of the seat and flank panel when said upper surfaces are co-planar (as indicated in FIG. 2) so that a person sitting on the seat can slide across the hinge device and onto the flank panel for transferring from the seat to another support (such as a seat, wheelchair, bed or trolley) on which the flank panel rests, and vice versa for a reverse transfer to the seat.

Figure 2:
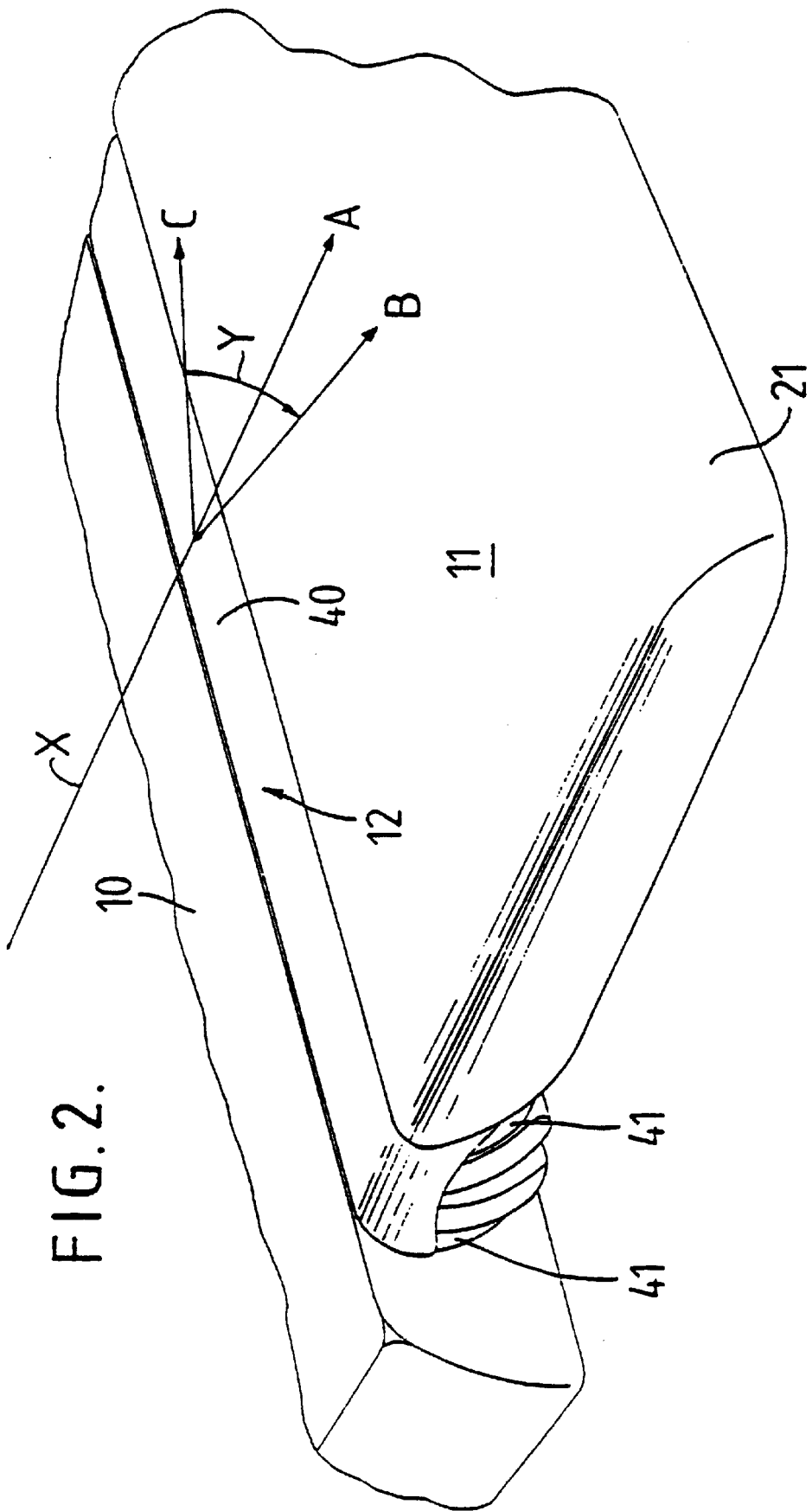
FIGS. 2 and 3 are perspective views of the first embodiment showing the flank panel in an extended "in-use" condition and folded up to rest on the seat in a "storage" condition respectively.

To facilitate such transfer, the height of the seat is preferably adjusted relative to the support on which the flank panel rests so that the flank panel declines in the direction of transfer, and the knee joints are formed so that the surfaces 36 rest on the surfaces 31 throughout the angle Y (as shown in FIG. 2), so as to reliably support and provide smooth articulation of the flank panel as it is moved between a maximum load bearing declination B (from the nominally horizontal direction A) and a maximum load bearing inclination C from said direction A which is co-planar with the plane X of the seat. Throughout the angle Y, upper portions 37 (FIG. 3) of the heads 15,25 are held in abutment or close proximity by the hinge device but at about the declination B lower portions of the leads come into abutment to limit said declination of the flank panel.

When the flank panel is swung upwards above the inclination C the surface 36 is raised from the surface 31 and the bearing part 34 is lifted out of the female part 32 so that the knee joint becomes dislocated or disarticulated as the flank panel is swung to a storage position overlying the seat as shown in FIG. 3.

In use if the seat is supported so that its plane is inclined from front to rear i.e. in a direction transverse to the line X in FIG. 2, and the flank panel rests on a nominally horizontal supporting surface, the hinge device can flex longitudinally when a load is imposed on the flank panel and one or other of the knee joints can become partially disjointed to the extent that the surfaces 31 and 36 are separated to accommodate misalignment of the planes of the seat and flank panel without disruption of the other functions of the hinge device.

The invention is not confined to details of the foregoing examples and many variations and functional equivalents may be adopted or substituted in apparatus of the invention, as defined by the appended claims. For example, the hinge device may be provided on a cot to support one side wall thereof, so that the side wall can be swung down to serve as a bridge between the cot and a bed, or used as a changing table alongside the cot.

The invention includes and provides apparatus comprising any novel part, arrangement of parts or functional feature disclosed herein or in the accompany drawings or any novel combination of such parts or features.

What is claimed is:

1. A hinge device, comprising:

two elongate substantially rigid parts having mountings defining a neck portion and a head portion, the neck portion projecting from the rigid parts and terminating in the head portion; and a flexible moulding comprising an elongate flexible web between mounting formations of the moulding;

wherein the mounting formations of the moulding resiliently and releasably engage the mountings of the rigid parts, so that the web provides a flexible bridge between the two rigid parts;

wherein the mounting formations are elastomeric and define an aperture in which the mountings of each of the rigid parts are engaged so that the mounting formations embrace the neck portion of the mountings; and wherein the mountings interengage so as to provide a knee joint comprising on one mounting of the mountings a support in the form of a trunnion or lug, which provides an upwardly facing bearing surface below an upwardly extending recess in the one mounting between upstanding abutment surfaces defined by the one mounting and on another mounting a bearing part in the form of a trunnion formation projecting from the head to engage on the bearing surface.

2. A device as claimed in claim 1, wherein the web covers the head portions of the mountings and provides a smooth upper surface over the mountings.

3. A device as claimed in claim 1 or 2, wherein a plurality of the mountings are provided on each of the rigid parts.

4. A device as claimed in claim 1 or 2, wherein the mounting formations include a longitudinally extending reinforcement member moulded into an upper portion of the flexible moulding.

5. A device as claimed in claim 1 or 2, further comprising a flexible but substantially inelastic layer incorporated into the flexible moulding so as to internally reinforce the web.

6. A device as claimed in claim 1 or 2, wherein the flexible moulding has end portions, each end portion having structure constructed and arranged to provide a bias tending to urge the device to a predetermined configuration.

7. A device as claimed in claim 6, wherein the end portions comprise transverse elastic webs of moulding extending across the flexible moulding to interconnect dependent end parts of the mounting formations.

8. A patient support apparatus for use in assisting persons to transfer from one support device such as a chair or bed to another, comprising:

a platform having a lateral margin;

a panel having a lateral margin pivotally connecting the lateral margin of the platform to the lateral margin of the panel, wherein the lateral margins have mountings defining a neck portion and a head portion, the neck portion projecting from the lateral margins and terminating in the head portion; and a flexible moulding comprising an elongate flexible web between mounting formations of the moulding;

wherein the mounting formations of the moulding resiliently and releasably engage the mountings of the lateral margins, so that the web provides a flexible bridge between the lateral margins;

wherein the mounting formations are elastomeric and define an aperture in which the mountings of each of the lateral margins are engaged so that the mounting formations embrace the neck portion of the mountings; and wherein the mountings interengage so as to provide a knee joint comprising on one mounting of the mountings a support in the form of a trunnion or lug, which provides an upwardly facing bearing surface below an upwardly extending recess in the one mounting between upstanding abutment surfaces defined by the one mounting and on another mounting a bearing part in the form of a trunnion formation projecting from the head to engage on the bearing surface.

9. A device as claimed in claim 8, wherein the web covers the head portions of the mountings and provides a smooth upper surface over the mountings.

10. The apparatus claimed in claim 8 or claim 9, wherein the support on the one mounting projects from the lateral margin of the platform to engage in a cavity or recess formed in the lateral margin of the panel for supporting the panel when it is in a plane of the platform or slightly below the plane of the platform.

\* \* \* \* \*